United States Patent
Fujita et al.

(10) Patent No.: US 7,894,970 B2
(45) Date of Patent: Feb. 22, 2011

(54) MOTORCYCLE, DEVICE AND METHOD FOR CONTROLLING THE SAME AND DEVICE AND METHOD FOR DETECTING SLIP QUANTITY OF MOTORCYCLE

(75) Inventors: Hirokazu Fujita, Shizuoka (JP); Tomohiro Kinoshita, Shizuoka (JP)

(73) Assignee: Yamaha Hatsudoki Kabushiki Kaisha, Iwata-Shi (JP)

(*) Notice: Subject to any disclaimer, the term of this patent is extended or adjusted under 35 U.S.C. 154(b) by 338 days.

(21) Appl. No.: 11/971,184

(22) Filed: Jan. 8, 2008

(65) Prior Publication Data

US 2008/0167784 A1 Jul. 10, 2008

(30) Foreign Application Priority Data

Jan. 9, 2007 (JP) .............................. 2007-001052

(51) Int. Cl.
*G06F 7/00* (2006.01)
*G06F 17/00* (2006.01)
*G05D 1/00* (2006.01)
*B60T 7/12* (2006.01)

(52) U.S. Cl. .............................. 701/90; 701/71; 701/74; 701/82; 180/197

(58) Field of Classification Search ................ 701/71, 701/74, 79, 82, 84, 90; 180/197, 201
See application file for complete search history.

(56) References Cited

U.S. PATENT DOCUMENTS

| | | | | |
|---|---|---|---|---|
| 5,225,982 A * | 7/1993 | Ito et al. | .................. | 701/91 |
| 5,282,137 A * | 1/1994 | Suzuki et al. | .................. | 701/85 |
| 5,481,455 A * | 1/1996 | Iwata et al. | .................... | 701/74 |
| 5,676,433 A * | 10/1997 | Inagaki et al. | ................ | 303/146 |
| 5,721,681 A * | 2/1998 | Borschert et al. | ............. | 701/37 |
| 6,341,826 B2 * | 1/2002 | Onogi | .......................... | 303/112 |
| 6,745,143 B1 * | 6/2004 | Gronau et al. | ................. | 702/96 |
| 6,895,317 B2 * | 5/2005 | Yasui et al. | ..................... | 701/36 |
| 7,423,393 B2 * | 9/2008 | Wakao et al. | ................. | 318/371 |
| 7,463,964 B2 * | 12/2008 | Ushiroda et al. | .............. | 701/80 |
| 7,577,510 B2 * | 8/2009 | Fodor et al. | .................... | 701/82 |
| 2003/0220731 A1 * | 11/2003 | Zierolf | ......................... | 701/71 |
| 2004/0093128 A1 * | 5/2004 | Kin | ................................... | 701/1 |
| 2007/0088475 A1 * | 4/2007 | Nordgren et al. | .............. | 701/37 |
| 2007/0112495 A1 * | 5/2007 | Murray | ......................... | 701/70 |

FOREIGN PATENT DOCUMENTS

JP 08-232697 9/1996

\* cited by examiner

*Primary Examiner*—Jack Keith
*Assistant Examiner*—Rami Khatib
(74) *Attorney, Agent, or Firm*—Rabin & Berdo, PC

(57) ABSTRACT

Traction control for a motorcycle including a driving wheel speed sensor and a driven wheel speed sensor. An ECU controls an engine on the basis of a corrected slip signal obtained by subtracting a low frequency component of a pre-correction slip signal from the pre-correction slip signal. The pre-correction slip signal is obtained by subtracting a speed of a front wheel detected by the driven wheel speed sensor from a speed of a rear wheel detected by the driving wheel speed sensor.

6 Claims, 22 Drawing Sheets

| DRIVEN WHEEL SPEED (kw/h) | 0 | 10 | 20 | 30 | 40 | 50 | 100 |
|---|---|---|---|---|---|---|---|
| MAXIMUM VALUE (kw/h) | 0 | 1 | 2 | 3 | 4 | 5 | 10 |
| MINIMUM VALUE (kw/h) | 0 | -0.5 | -1 | -1.5 | -2 | -2.5 | -5 |

Fig. 12

| DRIVEN WHEEL SPEED (kw/h) | 0 | 10 | 20 | 30 | 40 | 50 |
|---|---|---|---|---|---|---|
| TIME CONSTANT (Hz) | 0.3 | 0.3 | 0.3 | 0.5 | 0.5 | 1.0 |

Fig. 16

| THROTTLE OPENING (%) | 0 | 10 | 20 | 50 |
|---|---|---|---|---|
| TIME CONSTANT (Hz) | 0.3 | 0.5 | 0.5 | 1.0 |

Fig. 19

MOTORCYCLE, DEVICE AND METHOD FOR CONTROLLING THE SAME AND DEVICE AND METHOD FOR DETECTING SLIP QUANTITY OF MOTORCYCLE

RELATED APPLICATIONS

This application claims the benefit of priority under 35 USC 119 of Japanese patent application no. 2007-001052, filed on Jan. 9, 2007, which application is hereby incorporated by reference in its entirety.

BACKGROUND OF THE INVENTION

1. Field of the Invention

The invention relates to a device and method of controlling a motorcycle, and more particularly to a device and method for detecting a slip quantity of a motorcycle.

2. Description of Related Art

Various traction control methods for motorcycles are known (JP-A-8-232697, for example). One such traction control method is based on a slip ratio calculated on the basis of rotation speeds of a driving wheel and a driven wheel. The driving force of the motorcycle is controlled in accordance with the calculated slip ratio.

A ratio of circumferential length of tires between front and rear wheels, however, changes in accordance with an inclining angle of the motorcycle (referred to as a "bank angle", hereinafter). Accordingly, the slip ratio is calculated when the motorcycle is inclined even when the motorcycle does not slip. Further, when the motorcycle has slipped, inclining the motorcycle causes a slip ratio larger or smaller than a slip ratio suitable for an actual slip degree to be calculated. Thus, it is impossible to carry out accurate traction control in accordance with this method.

In view of the above, JP-A-8-232697 proposes a traction control method taking bank angle into consideration. In JP-A-8-232697, a degree of acceleration slip is determined on the basis of a width of a change in rotation number of an engine. Engine output is controlled by delaying an angle of engine ignition timing in accordance with the determined degree of slip. In the traction control method of JP-A-8-232697, the larger the bank angle is, the larger the delay angle of the engine ignition timing is. Moreover, the delay quantity of the engine ignition timing is further increased in banking in accordance with an increase in width of a change in rotation number of the engine.

JP-A-8-232697 describes that engine output is suppressed in banking, which allows slip of a driving wheel in banking to be prevented in accordance with the above method.

The ratio of circumferential length of tires between the front and rear wheels is not only dependent on the bank angle. For example, the ratio of circumferential length also changes when the motorcycle speed changes, and thereby, an expansion ratio of a tire changes. Thus, accurate traction control cannot be performed even with the traction control method of JP-A-8-232697.

SUMMARY OF THE INVENTION

In view of the above, the invention provides more accurate traction control of a motorcycle.

A motorcycle in accordance with the invention comprises a driving source; a driving wheel driven by the driving source; a driven wheel; and a control part. The motorcycle further comprises a driving wheel speed sensor that detects a speed of the driving wheel and a driven wheel speed sensor that detects a speed of the driven wheel. The control part controls the driving source on the basis of a corrected slip signal obtained by subtracting a low frequency component of a pre-correction slip signal from the pre-correction slip signal. The pre-correction slip signal is obtained by subtracting a speed of the driven wheel detected by the driven wheel speed sensor from a speed of the driving wheel detected by the driving wheel speed sensor.

A control device in accordance with the invention comprises a driving source; a driving wheel driven by means of the driving source; a driven wheel; a driving wheel speed sensor for detecting a speed of the driving wheel; and a driven wheel speed sensor for detecting a speed of the driven wheel. The control device controls the driving source on the basis of a corrected slip signal obtained by subtracting a low frequency component of the pre-correction slip signal from the pre-correction slip signal. The pre-correction slip signal is obtained by subtracting a speed of the driven wheel detected by the driven wheel speed sensor from a speed of the driving wheel detected by the driving wheel speed sensor.

A slip quantity detecting device in accordance with the invention comprises a driving source; a driving wheel driven by means of the driving source; a driven wheel; a driving wheel speed sensor for detecting a speed of the driving wheel; and a driven wheel speed sensor for detecting a speed of the driven wheel. The slip quantity detecting device detects a slip quantity of the motorcycle by subtracting a low frequency component of the pre-correction slip signal from the pre-correction slip signal obtained by subtracting a speed of the driven wheel detected by the driven wheel speed sensor from a speed of the driving wheel detected by the driving wheel speed sensor.

A control method in accordance with the invention is provided for a motorcycle having a driving source; a driving wheel driven by means of the driving source; a driven wheel; a driving wheel speed sensor for detecting a speed of the driving wheel; and a driven wheel speed sensor for detecting a speed of the driven wheel. The control method controls the driving source on the basis of a corrected slip signal. The corrected slip signal is obtained by subtracting a low frequency component of the pre-correction slip signal from the pre-correction slip signal. The pre-correction slip signal is obtained by subtracting a speed of the driven wheel detected by the driven wheel speed sensor from a speed of the driving wheel detected by the driving wheel speed sensor.

A slip quantity detecting method in accordance with the invention is provided for detecting a slip quantity of a motorcycle comprising a driving source; a driving wheel driven by means of the driving source; a driven wheel; a driving wheel speed sensor for detecting a speed of the driving wheel; and a driven wheel speed sensor for detecting a speed of the driven wheel. The slip quantity detecting method detects a slip quantity of the motorcycle by subtracting a low frequency component of the pre-correction slip signal from the pre-correction slip signal obtained by subtracting a speed of the driven wheel detected by the driven wheel speed sensor from a speed of the driving wheel detected by the driving wheel speed sensor.

In accordance with the invention, more accurate traction control of a motorcycle is achieved.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 12 is a table correlating exemplary upper and lower limit value data of a pre-correction slip signal with front (driven) wheel speed in Embodiment 2.

FIG. 16 is a table correlating exemplary time constant data with front (driven) wheel speed in Embodiment 3.

FIG. 19 is a table correlating exemplary time constant data with a throttle opening in Modification 3.

DETAILED DESCRIPTION OF THE INVENTION

Embodiment 1

A motorcycle 1 in accordance with a first embodiment of the invention (Embodiment 1) is now described in detail with reference to FIGS. 1-7. Motorcycle 1 is one example of a motorcycle to which the invention is applied, however, the invention is not so limited. The invention may be applied to other motorcycle types such as moped types, motor scooter types and off-road types, for example.

—Structure of Motorcycle 1—

Figure 1:
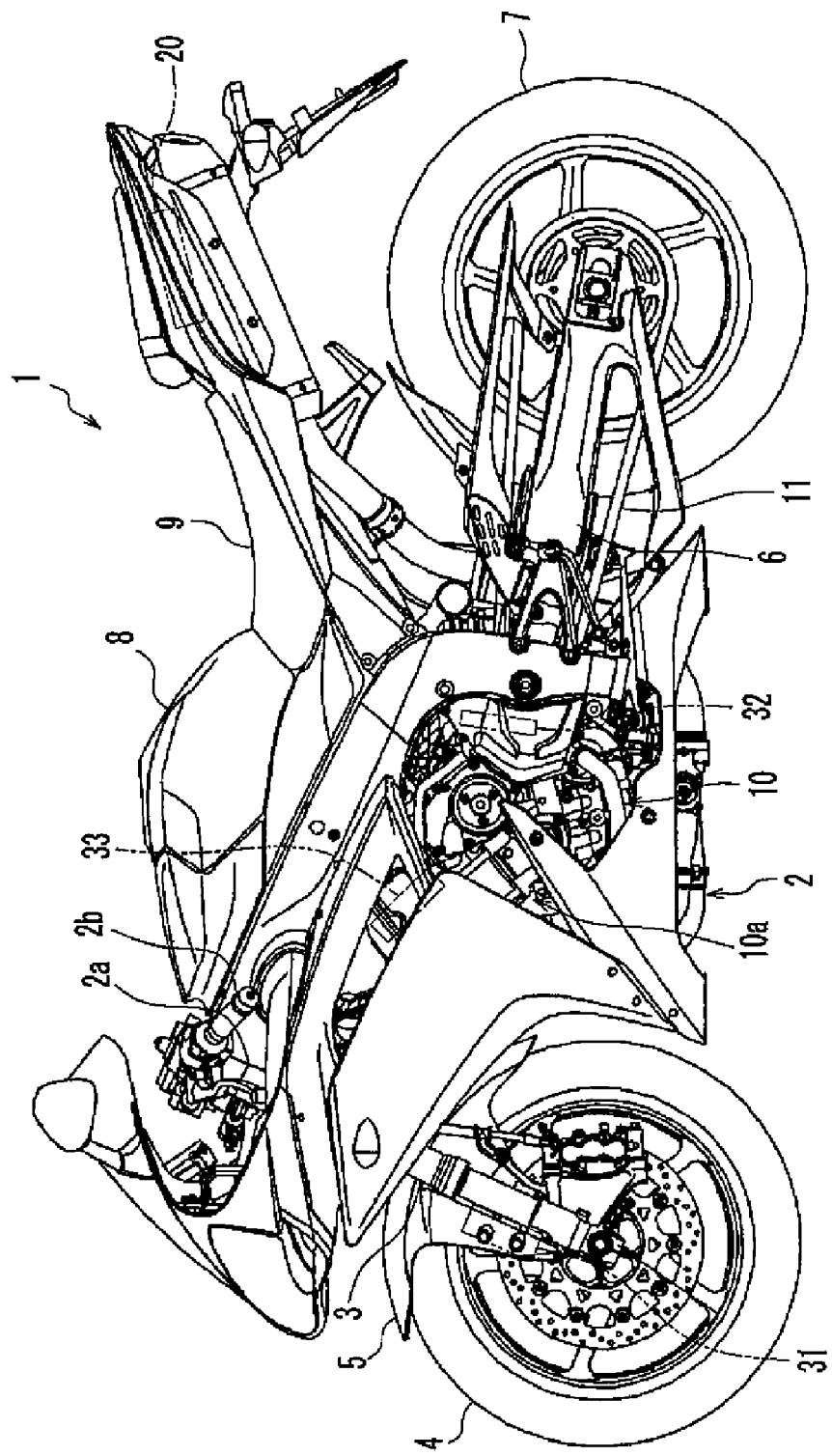
FIG. 1 is a left side view of a motorcycle in accordance with a first embodiment of the invention (Embodiment 1).

FIG. 1 is a left side view of motorcycle 1. In the following description, back-and-forth and lateral directions are from the perspective of a rider sitting on a seat 9. Motorcycle 1 comprises a body frame 2 including a steering head pipe 2a. A front wheel 4 is rotatably mounted to a lower end of steering head pipe 2a. A front fender 5 covering upper and rear parts of front wheel 4 is mounted to front fork 3. A rear wheel 7 is rotatably mounted to a rear end of swing arm 6 mounted to a rear end of body frame 2. A body cover 8 covers parts of upper and side surfaces of body frame 2. Seat 9 is mounted just behind the center of body cover 8 in the back-and-forth direction.

An engine unit 10 suspended on body frame 2 is formed from an engine 10a as a driving source, a clutch, a transmission and so on. Engine 10a is described herein as an internal combustion engine, but may another type of engine such as a motor engine.

Figure 2:
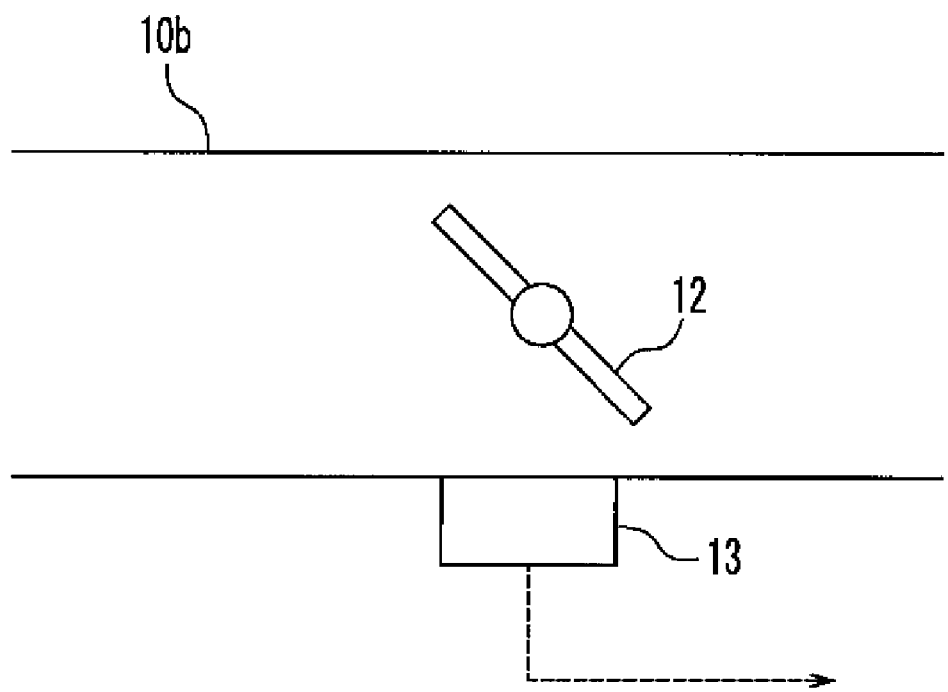
FIG. 2 is a simplified view of a throttle valve according to the invention.
Figure 3:
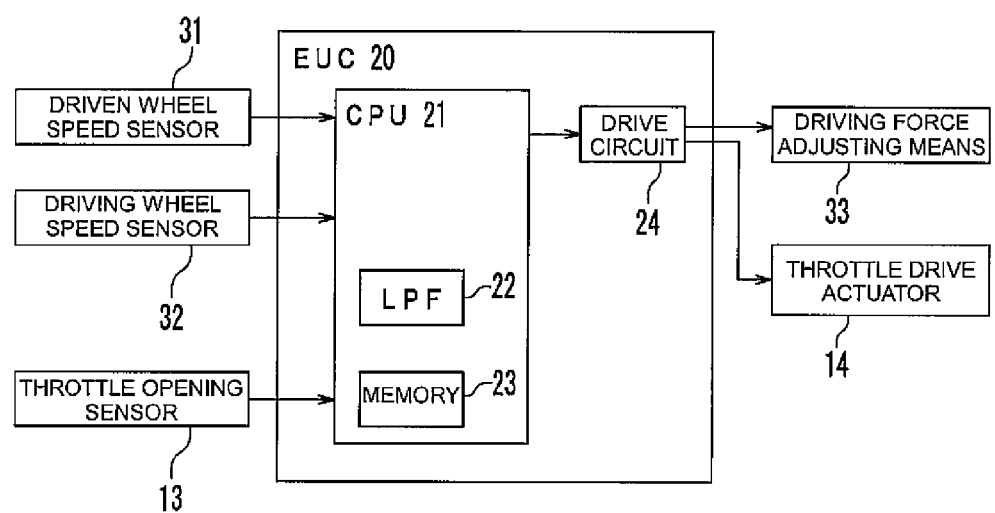
FIG. 3 is a block diagram of an ECU in accordance with Embodiment 1.

As shown in FIG. 2, an electronic control type throttle valve 12 is provided in an intake pipe 10b of engine 10a. A throttle opening sensor 13 detects a throttle opening of throttle valve 12. Throttle opening sensor 13 is connected to a CPU 21 of an ECU 20. Throttle valve 12 is driven by a throttle drive actuator (FIG. 3). The throttle drive actuator is driven by CPU 21 in accordance with a degree of rotation of an acceleration grip 2b.

Driving force generated in engine unit 10 is transmitted to rear wheel 7 through a driving force transmitting means 11 such as a chain, a belt and a drive shaft. Accordingly, rear wheel 7 is a driving wheel and front wheel 4 is a driven wheel. A width of a cross section of rear wheel 7 when motorcycle 1 is stopped may be equal to or different from a width of a cross section of front wheel 4 when motorcycle 1 is stopped. Rear wheel 7 may be formed from one wheel or from plural wheels provided in parallel in a vehicle width direction.

ECU (engine control unit) 20 is mounted on a rear side of seat 9 in the back-and-forth direction and controls engine unit 10. A driven wheel speed sensor 31 detects a speed of front wheel 4 and a driving wheel speed sensor 32 detects a speed of rear wheel 7. A driving force adjusting means 33 adjusts ignition timing of engine 10a. Driving force adjusting means 33 and ECU 20 form a control part.

—Structure of ECU 20—

As shown in FIG. 3, ECU 20 comprises CPU 21 and a drive circuit 24. CPU 21 comprises a memory 23. CPU 21 and drive circuit 24 form an operation part. Memory 23 stores various settings and such. A storing device such as a hard disc may be provided in addition to memory 23.

CPU 21 carries out a low-pass filter (LPF) process. For convenience of description, a low-pass filter (LPF) 22 is shown as a component of CPU 21 in FIG. 3, but a circuit functioning as low-pass filter 22 is not separately provided. However, low-pass filter 22 may alternatively be provided as a separate circuit.

CPU 21 is connected to throttle opening sensor 13, driven wheel speed sensor 31, driving wheel speed sensor 32 and drive circuit 24. Drive circuit 24 is further connected to driving force adjusting means 33 and throttle drive actuator 14.

Throttle drive actuator 14 drives throttle valve 12. Concretely, a control signal is outputted from drive circuit 24 to throttle drive actuator 14 in accordance with the throttle opening detected by throttle opening sensor 13, a degree of rotation of acceleration grip 2b and such. Throttle drive actuator 14 drives throttle valve 12 on the basis of the control signal.

—Outline of Traction Control in Embodiment 1—

Traction control in Embodiment 1 effectively prevents a slip from occurring in banking motorcycle 1. A slip signal obtained by subtracting a speed of front wheel 4 (driven wheel speed) from a speed of rear wheel 7 (driving wheel speed) is roughly divided into a component caused by banking of motorcycle 1 (referred to as a "lean component", hereinafter) and a component caused by a slip of at least one of front wheel 4 and rear wheel 7 (referred to as a "slip component", hereinafter). The lean component is not generated when inclination of motorcycle 1 is not changed, and is generated when motorcycle 1 is banked and its inclination is changing. That is, the lean component is generated when motorcycle 1 is banked, which is generally performed not so fast. Accordingly, the lean component is lower than the slip component in frequency. As a result of diligent study, the inventors have found for the first time the difference in frequency between the lean component and the slip component, which allows the invention to be carried out in practice.

The traction control method of Embodiment 1 controls engine 10a on the basis of a corrected slip signal obtained by subtracting a low frequency (lean) component from a pre-correction slip signal obtained by subtracting a speed of front wheel 4 (driven wheel speed) from a speed of rear wheel 7 (driving wheel speed). The traction control of Embodiment 1 is described further with reference to FIG. 4.

—Concrete Contents of Traction Control in Embodiment 1—

Figure 4:
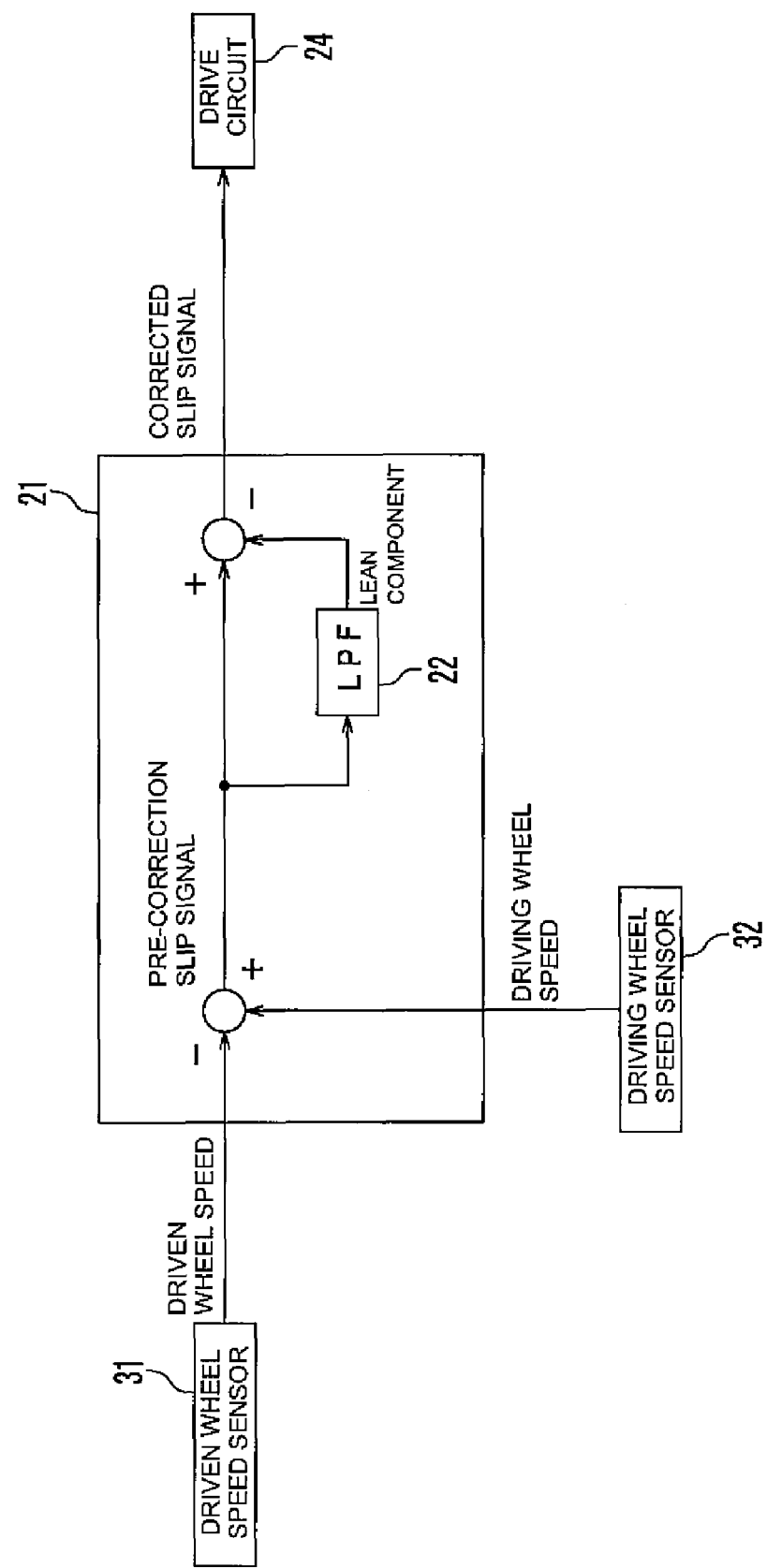
FIG. 4 is a block diagram showing traction control in Embodiment 1.

As shown in FIG. 4, which is a block diagram of the traction control of Embodiment 1, driven wheel speed sensor 31 outputs a speed of front wheel 4 (driven wheel speed) to CPU 21. Driving wheel speed sensor 32 outputs a speed of rear wheel 7 (driving wheel speed) to CPU 21. CPU 21 subtracts the driven wheel speed from the driving wheel speed to obtain a pre-correction slip signal.

Further, CPU 21 performs a low-pass filter process to take out a low frequency (lean) component of the pre-correction slip signal. The low frequency component of the pre-correction slip signal has a frequency lower than that of the slip component. A cutoff frequency of the low frequency component can be properly set, taking account of a type of motorcycle 1, a condition of a road surface for running and the like. For example, the cutoff frequency of the low frequency component may be set at 5 Hz or 3 Hz. That is, the low frequency component may have a frequency equal to or lower than 5 Hz, or equal to or lower than 3 Hz.

CPU 21 subtracts the low frequency (lean) component that has been taken out from the pre-correction slip signal to obtain the corrected slip signal. CPU 21 outputs the corrected slip signal to drive circuit 24.

Drive circuit 24 outputs a control signal corresponding to the corrected slip signal to driving force adjusting means 33 and throttle drive actuator 14 (FIG. 3). Driving force control means 33 and throttle drive actuator 14 contribute to control an output of engine 10a in accordance with the control signal. Driving force adjusting means 33 adjusts the ignition timing of engine 10a (rotation number of engine 10a) in accordance with the control signal. For example, the ignition timing of engine 10a may be delayed in accordance with the control signal. On the other hand, throttle drive actuator 14 adjusts an opening of throttle valve 12 (throttle opening) in accordance with the control signal outputted from drive circuit 24. While this is one exemplary method of adjusting the driving force outputted from engine 10a, the invention is not limited to this method.

Figure 5:
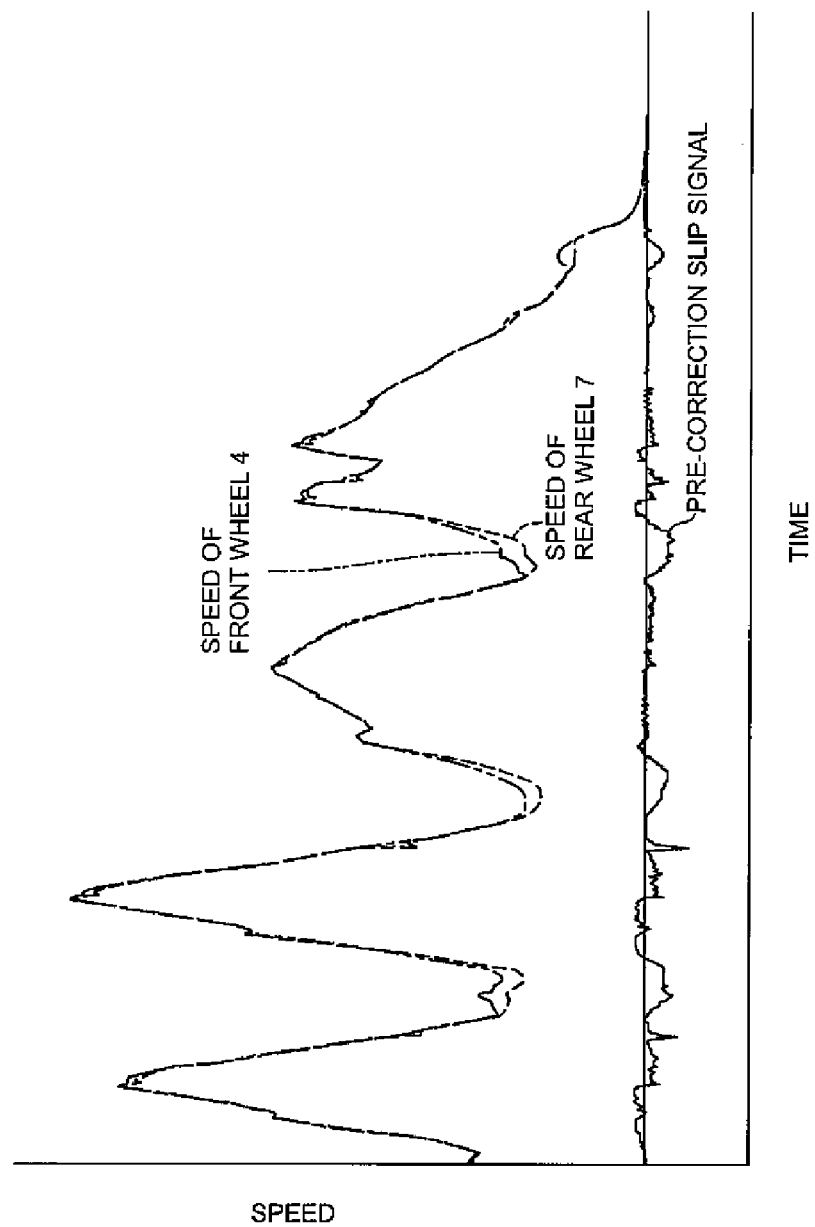
FIG. 5 is a graph showing speeds of front and rear wheels and a pre-correction slip signal according to Embodiment 1.
Figure 6:
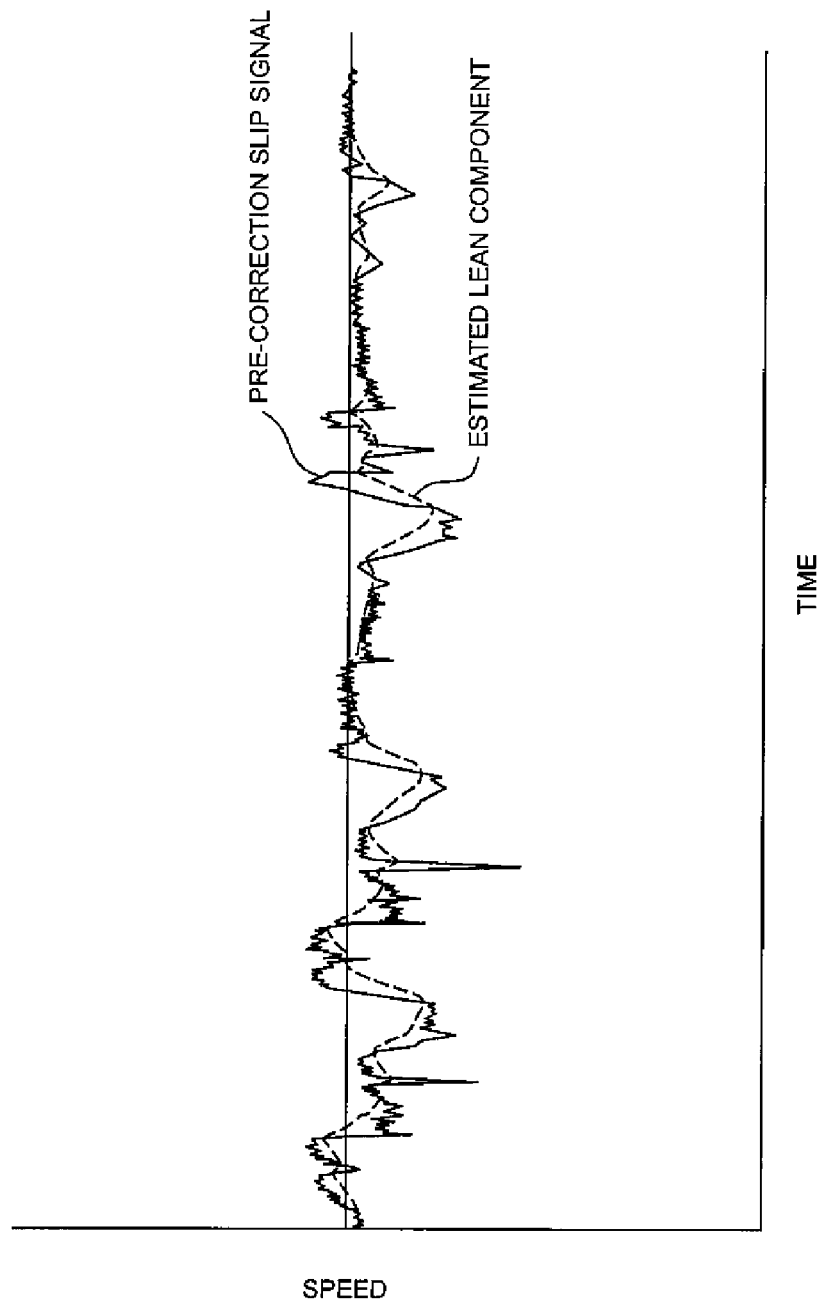
FIG. 6 is a graph showing a pre-correction slip signal and an estimated lean component according to Embodiment 1.
Figure 7:
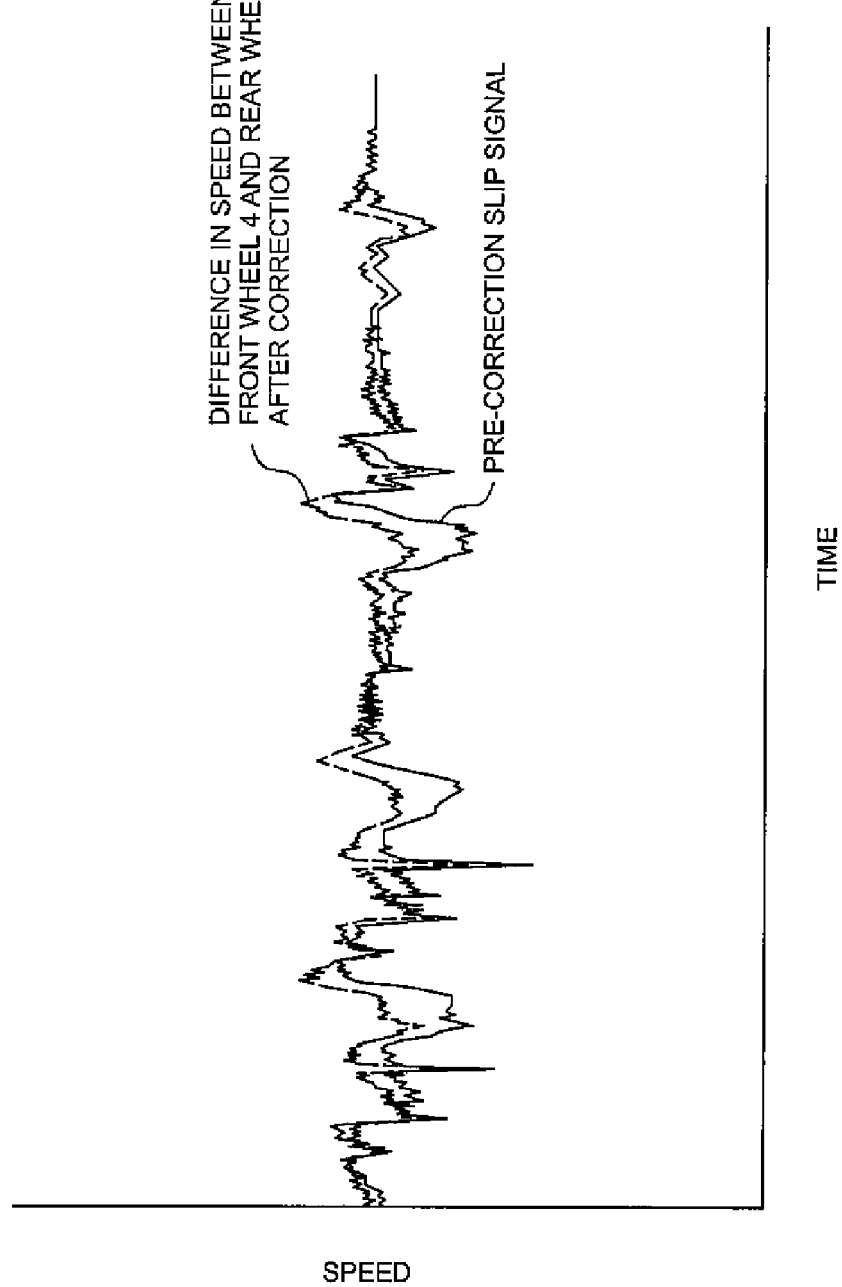
FIG. 7 is a graph showing a pre-correction slip signal and a difference in speed between the front and rear wheels after correction and after traction control according to Embodiment 1.

FIGS. 5-7 exemplify the speed of, and difference in speed between, front wheel 4 and rear wheel 7 after correction when the traction control of Embodiment 1 is performed. FIG. 5 shows the speed of front wheel 4 (driven wheel speed), the speed of rear wheel 7 (driving wheel speed) and the pre-correction slip signal (the difference in speed between front wheel 4 and rear wheel 7). FIG. 6 shows the pre-correction slip signal and a supposed lean (low frequency) component. FIG. 7 shows the pre-correction slip signal and the difference in speed between front wheel 4 and rear wheel 7 after correction after traction control has been performed. As shown in FIG. 7, the traction control of Embodiment 1 allows a more accurate slip signal to be obtained.

—Operation and Effect—

As described above, a low frequency (lean) component is removed from the pre-correction slip signal to control engine 10a on the basis of the corrected slip signal supposed to be the slip component. Accordingly, a slip is accurately prevented from occurring.

A low frequency component of the slip component is not included in the corrected slip signal is. Accordingly, engine 10a is not likely to be controlled in accordance with a degree of the slip. As a result, a slip with a comparatively low frequency is likely to occur. A driver, however, can comparatively easily correspond to the slip with a comparatively low frequency. Therefore, not so much difficulty arises in driving motorcycle 1. However, a slip with a comparatively high frequency, which is difficult for a driver to correspond, is prevented effectively. Motorcycle 1 is thereby excellent in stability in running.

The method of calculating the corrected slip signal is not specifically limited. The corrected slip signal can be easily calculated at a low cost by performing the low-pass filter process as in Embodiment 1.

The bank angle of motorcycle 1 is difficult to accurately detect because expansion of front wheel 4 and expansion of rear wheel 7 differ in accordance with running speed. Accordingly, a traction control method performed on the basis of the bank angle, such as that disclosed in JP-A-8-232697, cannot sufficiently prevent a slip and slips may occur with a comparatively high frequency, which is difficult for a driver to control. Moreover, a bank angle detection sensor is comparatively expensive and increases the cost of motorcycle 1. On the other hand, many motorcycles 1 are provided with driven wheel speed sensor 31 and driving wheel speed sensor 32, which are comparatively inexpensive. Therefore, the traction control method of Embodiment 1 can be practically carried out without greatly raising the cost of motorcycle 1.

<<Modification 1>>

Embodiment 1 uses a low-pass filter process to calculate the corrected slip signal. The corrected slip signal, however, may be calculated by other methods. In Modification 1, for example, a high-pass filter process is used to calculate the corrected slip signal. The description of Modification 1 refers to FIGS. 1 and 2 in common with Embodiment 1. Components having functions substantially same as those in Embodiment 1 are described with marks in common with Embodiment 1 and are omitted from repeat description.

Figure 8:
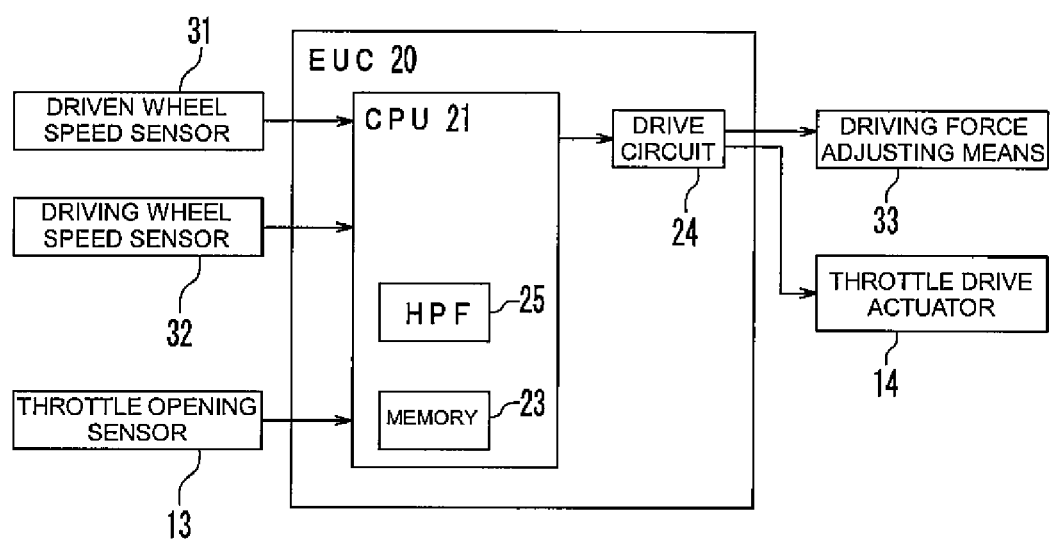
FIG. 8 is a block diagram of an ECU in accordance with a modification of Embodiment 1 (Modification 1).

FIG. 8 is a structural view of ECU 20 in Modification 1. ECU 20 comprises CPU 21 and drive circuit 24. CUP 21 comprises memory 23. In Modification 1, CPU 21 carries out a high-pass filter (HPF) process. For convenience of description, a high-pass filter (HPF) 25 is shown as a component of CPU 21 in FIG. 8, but a circuit functioning as a high-pass filter is not provided separately. However, high-pass filter 25 may alternately be provided as a separate circuit.

Figure 9:
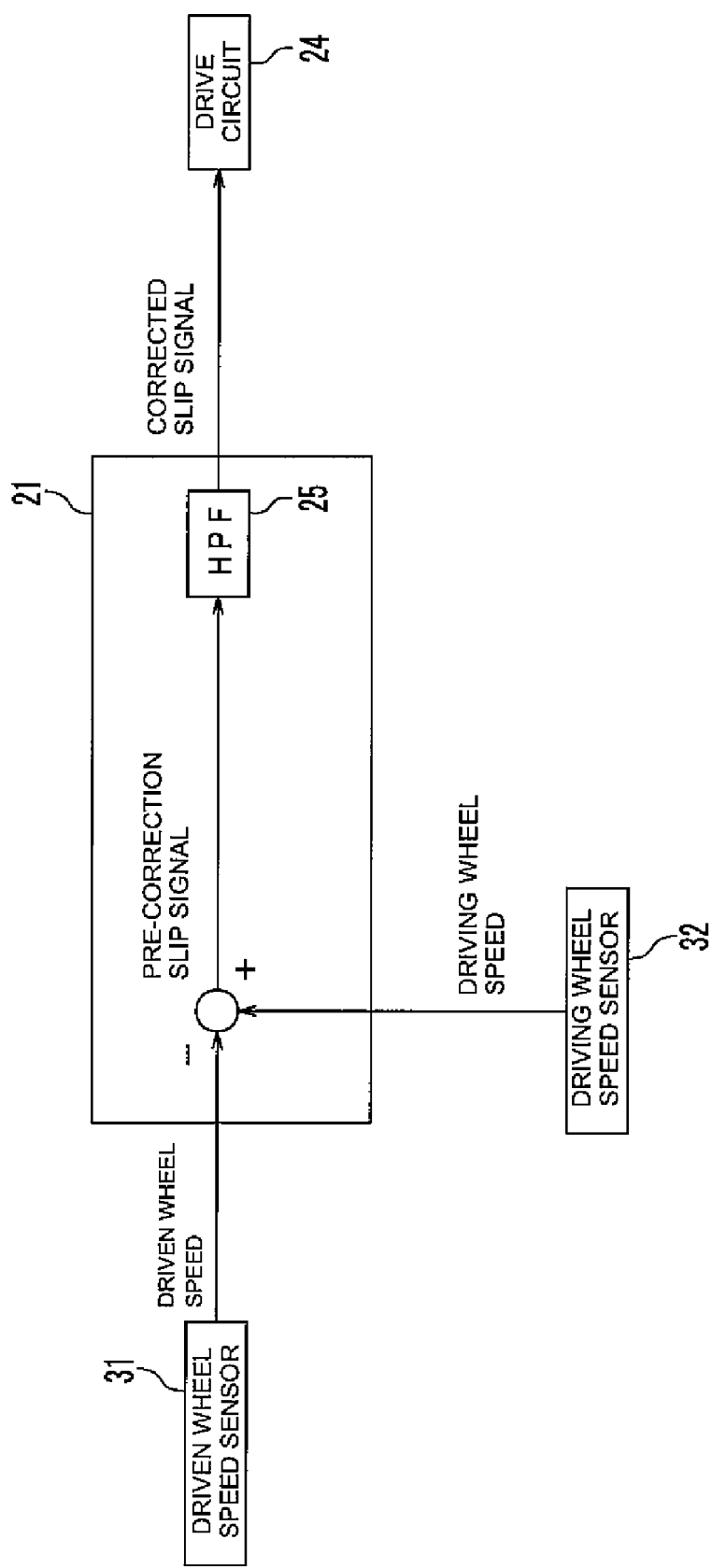
FIG. 9 is a block diagram showing traction control in Modification 1.

As shown in FIG. 9, which is a block diagram showing traction control in Modification 1, driven wheel speed sensor 31 outputs a speed of front wheel 4 (a driven wheel speed) to CPU 21. Driving wheel speed sensor 32 outputs a speed of rear wheel 7 (a driving wheel speed) to CPU 21. CPU 21 subtracts the driven wheel speed from the driving wheel speed to obtain the pre-correction slip signal.

CPU 21 takes out only a high frequency component of the pre-correction slip signal by removing the low frequency component in Embodiment 1 from the pre-correction slip signal. That is, the high frequency component of the pre-correction slip signal, which is supposed to be the slip component, is to be the corrected slip signal.

CPU 21 outputs the high frequency component (the corrected slip signal) to drive circuit 24. Drive circuit 24 outputs a control signal corresponding to the corrected slip signal to driving force adjusting means 33 and throttle drive actuator 14 (FIG. 8). Driving force control means 33 and throttle drive actuator 14 control engine 10a in accordance with the control signal.

As described above, a high-pass filter process may also be used to calculate the corrected slip signal.

Embodiment 2

Figure 10:
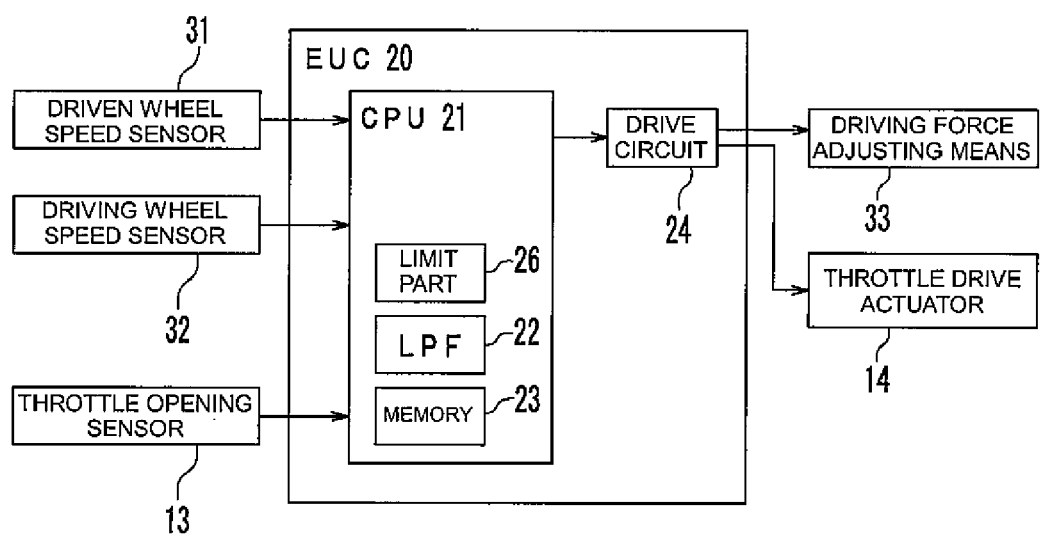
FIG. 10 is a block diagram of an ECU in accordance with a second embodiment of the invention (Embodiment 2).
Figure 11:
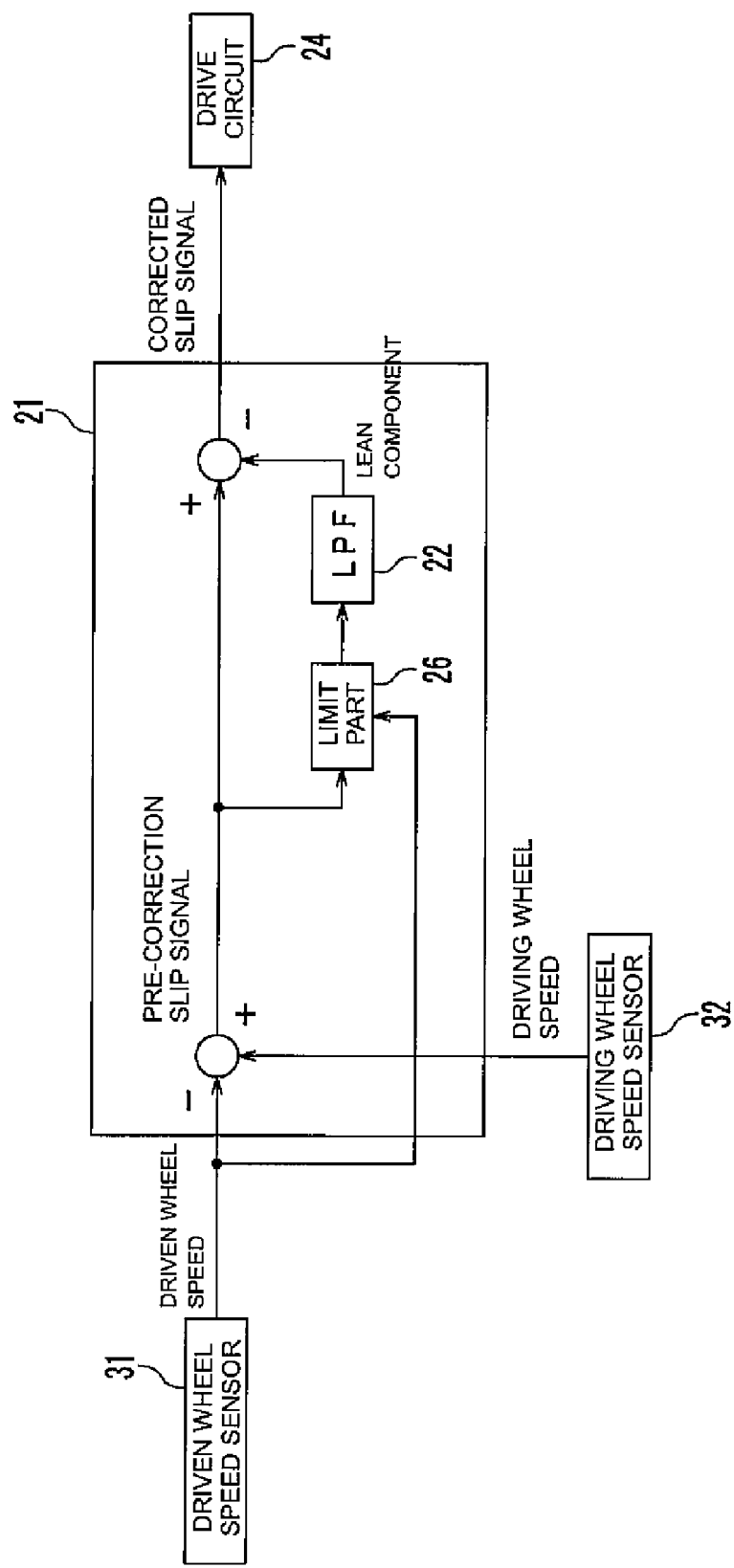
FIG. 11 is a block diagram showing traction control in Embodiment 2.

FIG. 10 is a structural view of ECU 20 in Embodiment 2. FIG. 11 is a block diagram showing traction control in Embodiment 2. The description of Embodiment 2 refers to FIGS. 1 and 2 in common with Embodiment 1. Components having functions substantially the same as those in Embodiment 1 are described with marks in common with Embodiment 1 and are omitted from repeat description.

As shown in FIG. 10, ECU 20 in Embodiment 2 comprises CPU 21 and drive circuit 24. CPU 21 carries out a low-pass filter (LPF) process similarly to Embodiment 1. CPU 21 also carries out a limit process on the basis of limit data. CPU 21 comprises a memory 23. A limit part (a limit circuit) for carrying out the limit process may be provided separately from CPU 21.

In Embodiment 2, data relating to upper and lower limit values of the pre-correction slip signal (referred to as "limit data", hereinafter) is stored in memory 23. The limit data may be upper and lower limit value data of the pre-correction slip signal correlated with at least one of the speed of front wheel 4 and the speed of rear wheel 7 (a correlation of at least one of the speed of front wheel 4 and the speed of rear wheel 7 with the upper and lower limit value data of the pre-correction slip signal), as exemplified in FIGS. 12 and 13. Thus, the limit data may be the upper and lower limit value data of the pre-correction slip signal, which is correlated with the speed of rear wheel 7 (driving wheel speed), for example. Further, the limit data may be the upper and lower limit value data of the pre-correction slip signal, which is correlated with an average value of the speed of front wheel 4 (driven wheel speed) and the speed of rear wheel 7 (driving wheel speed). An example is now described where the limit data is a correlation of the speed of front wheel 4 (driven wheel speed) with the upper and lower limit value data of the pre-correction slip signal.

—Traction Control in Embodiment 2—

As shown in FIG. 11, driven wheel speed sensor 31 outputs a speed of front wheel 4 (driven wheel speed) to CPU 21. Driving wheel speed sensor 32 outputs a speed of rear wheel 7 (driving wheel speed) to CPU 21. CPU 21 subtracts the driven wheel speed from the driving wheel speed to obtain the pre-correction slip signal.

CPU 21 obtains upper and lower limit values of the pre-correction slip signal corresponding to the driven wheel speed (or, the driving wheel speed; or, an average value between the driven wheel speed and the driving wheel speed) based on the limit data stored in memory 23 and the driven wheel speed (or, the driving wheel speed when the limit data is a correlation of the upper and the lower limit value of the pre-correction slip signal with the driving wheel speed; or, an average value between the speed of front wheel 4 (driven wheel speed) and the speed of rear wheel 7 (driving wheel speed) when the limit data is a correlation of the upper and the lower limit value of the pre-correction slip signal with the average value between the speed of front wheel 4 (driven wheel speed) and the speed of rear wheel 7 (driving wheel speed)).

CPU 21 carries out the limit process to limit the pre-correction slip signal to be equal to or more than the lower limit value and equal to or less than the upper limit value. Concretely, a part of the pre-correction slip signal that is equal to or more than the lower limit value and equal to or less than the upper limit value is left as it is. A part of the pre-correction slip signal that is less than the lower limit value is set to the lower limit value. A part of the pre-correction slip signal that is more than the upper limit value is set to the upper limit value.

Figure 13:
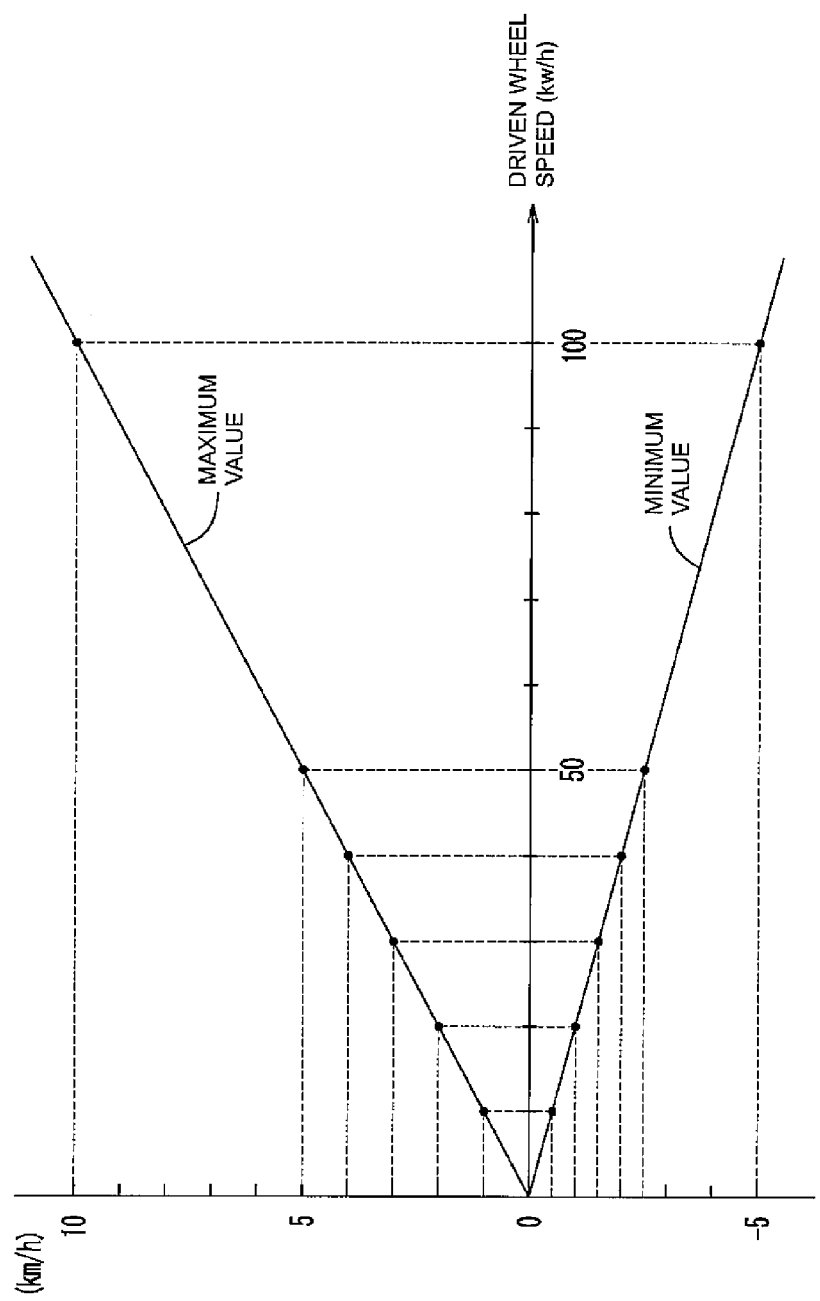
FIG. 13 is a graph correlating exemplary upper and lower limit value data of a pre-correction slip signal with front (driven) wheel speed in Embodiment 2.

For example, on the basis of FIGS. 12 and 13, CPU 21 judges that the upper limit value of the pre-correction slip signal is 10 km per hour when the speed of front wheel 4 (driven wheel speed) is 100 km per hour. CPU 21 judges that the lower limit value of the pre-correction slip signal is −5 km per hour. Accordingly, CPU 21 judges that a part (a time range) of the pre-correction slip signal that exceeds 10 km per hour, is 10 km per hour, and that a part (a time range) of the pre-correction slip signal that is lower than −5 km per hour, is −5 km per hour.

The upper and lower limit values of the pre-correction slip signal are upper and lower limit values of a difference between the driving and driven wheel speeds. When driven wheel speed sensor 31 and driving wheel speed sensor 32 detect speed on the basis of voltage, for example, the upper and lower limit values of the pre-correction slip signal are not upper and lower limit values of the detected voltage.

CPU 21 carries out a low-pass filter process to take out only a low frequency (lean) component (same as the low frequency component in Embodiment 1) from the pre-correction slip signal limited as described above. CPU 21 subtracts the low frequency component from the pre-correction slip signal to obtain the corrected slip signal. CPU 21 outputs the corrected slip signal to drive circuit 24.

Drive circuit 24 outputs a control signal corresponding to the corrected slip signal to driving force adjusting means 33 and throttle drive actuator 14 (FIG. 10). Driving force control means 33 and throttle drive actuator 14 contribute to control an output of engine 10a.

—Operation and Effect—

Limiting in advance a size of the pre-correction slip signal before the low-pass filter process, as in Embodiment 2, allows traction control to be accurately performed even when an excessive slip occurs for a long period.

When a slip continues for a long period, a frequency of the slip component of the detected pre-correction slip signal is lowered. Accordingly, the slip component of the pre-correction slip signal is trapped in the low-pass filter process when no limit process is carried out. As a result, no traction control is performed. This causes an excessive slip, and thereby, no traction control is carried out on the way when it is impossible to instantly get out of a slip condition, so that motorcycle 1 continues to slip.

On the other hand, in Embodiment 2, a size of the pre-correction slip signal is limited before the low-pass filter process. Accordingly, the slip component caused by a slip for a long period is not trapped in the low-pass filter process. This results in accurate traction control even when an excessive slip occurs for a long period.

The upper and lower limit values of the pre-correction slip signal (a difference between the speed of front wheel 4 and the speed of rear wheel 7) are different at each vehicle speed. The faster the vehicle speed (or driven wheel speed) is, the larger the upper and lower limit values of the pre-correction slip signal are. In comparison of running at 30 km per hour and running at 100 km per hour, for example, the upper and lower limit values of the pre-correction slip signal are larger in running at 100 km per hour. Accordingly, using fixed limit data for each vehicle speed (or each driven wheel speed) is likely to cause inaccurate traction control at a certain vehicle speed.

In Embodiment 2, limit data correlated with driven wheel speed (or vehicle speed, driving wheel speed, an average value between driven wheel speed and driving wheel speed or the like) is used. This allows traction control to be accurately performed regardless of the vehicle speed of motorcycle 1.

Embodiment 3

Figure 14:
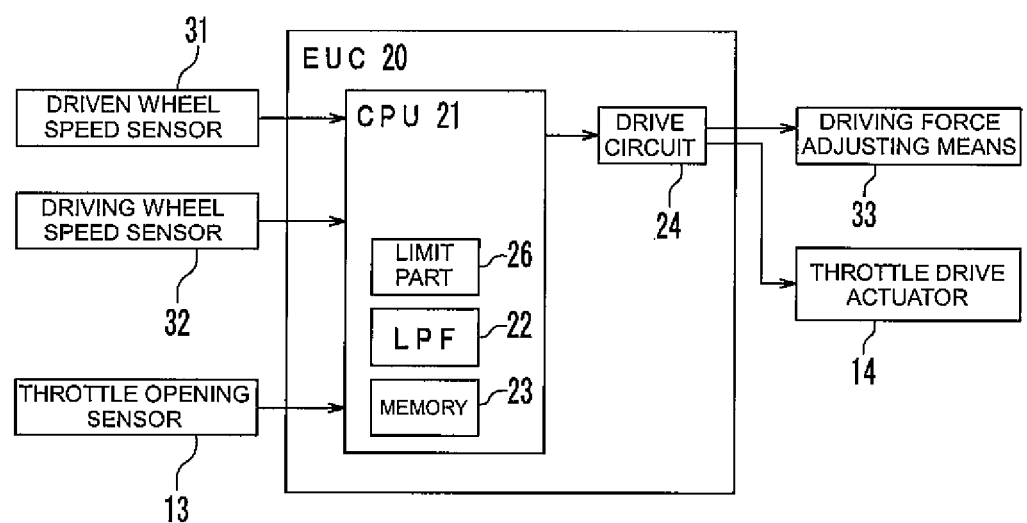
FIG. 14 is a block diagram of an ECU in accordance with a third embodiment of the invention (Embodiment 3).
Figure 15:
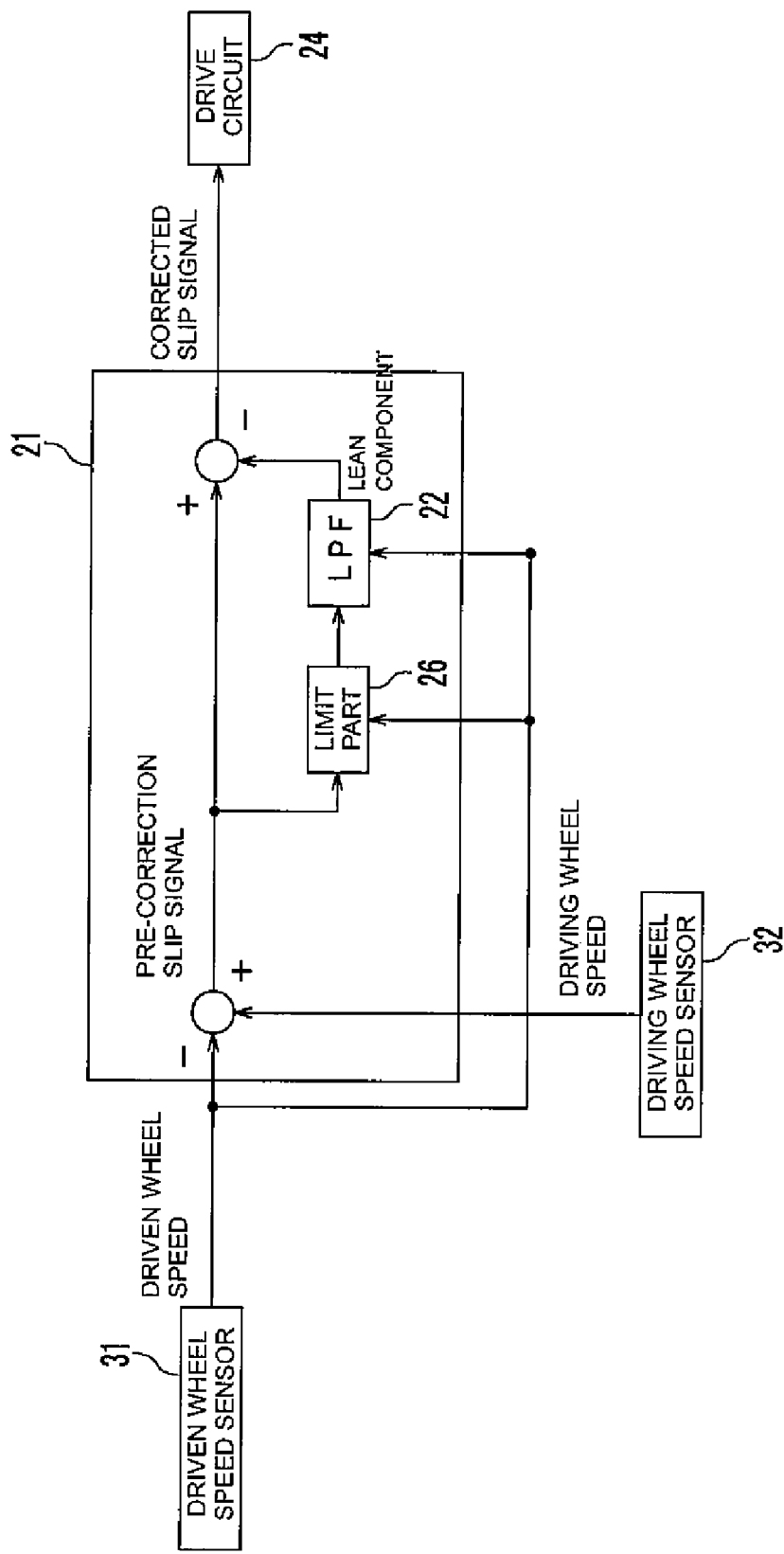
FIG. 15 is a block diagram showing traction control in Embodiment 3.

FIG. 14 is a structural view of ECU 20 in accordance with Embodiment 3. FIG. 15 is a block diagram showing traction control in Embodiment 3. The description of Embodiment 3 refers to FIGS. 1 and 2 in common with Embodiment 1. Components having functions substantially the same as those in Embodiment 1 are described with marks in common with Embodiments 1 and 2 and are omitted from repeat description.

As shown in FIG. 14, ECU 20 of Embodiment 3 comprises CPU 21 and drive circuit 24. CPU 21 carries out a low-pass filter (LPF) process similarly to Embodiment 1. CPU 21 also carries out a limit process on the basis of limit data. CPU 21 comprises memory 23. A limit part (a limit circuit) for carrying out the limit process may be provided separately from CPU 21.

Figure 17:
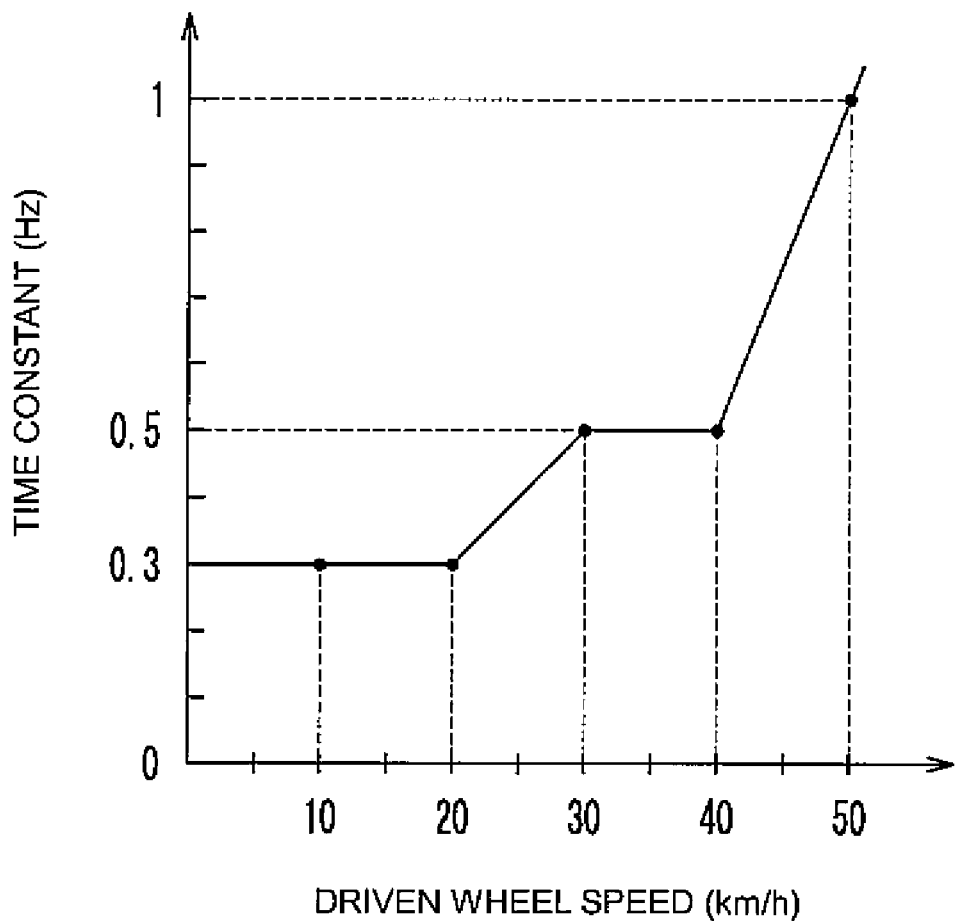
FIG. 17 is a graph correlating exemplary time constant data with front (driven) wheel speed in Embodiment 3.

In Embodiment 3, data relating to a correlation of at least one of a speed of front wheel 4 (driven wheel speed), a speed of rear wheel 7 (driving wheel speed), a throttle opening and engine torque with a time constant, the data exemplified in FIGS. 16 and 17, (time constant data) is stored in memory 23 together with the limit data. Concretely, in Embodiment 3, a speed of front wheel 4 (driven wheel speed) in correlation with a time constant is stored in memory 23, as shown in FIGS. 16 and 17. Alternatively, the time constant data may be a correlation of a time constant with a speed of rear wheel 7 (driving wheel speed). The time constant data may be also a correlation of a time constant with an average value between a speed of front wheel 4 (driven wheel speed) and a speed of rear wheel 7 (driving wheel speed). The time constant data may be a correlation with engine torque, for example, which can be estimated on the basis of a throttle opening, a rotation number of engine 10$a$ and the like.

The time constant data in Embodiment 3 is set, noting that a speed of an operation of banking motorcycle 1 by a driver is different for each vehicle speed of motorcycle 1. In a comparatively slow vehicle speed range (driven wheel speed), in which the operation of banking motorcycle 1 is (assumed to be) comparatively fast, a comparatively small time constant is set. On the other hand, a comparatively large time constant is set in a comparatively fast vehicle speed range (a driven wheel speed range) in which the operation of banking motorcycle 1 is (assumed to be) comparatively slow.

—Traction Control in Embodiment 3—

As shown in FIG. 15, driven wheel speed sensor 31 outputs a speed of front wheel 4 (driven wheel speed) to CPU 21. Driving wheel speed sensor 32 outputs a speed of rear wheel 7 (driving wheel speed) to CPU 21. CPU 21 subtracts the driven wheel speed from the driving wheel speed to obtain the pre-correction slip signal.

CPU 21 obtains upper and lower limit values of the pre-correction slip signal corresponding to the driven wheel speed (or, the driving wheel speed; or, an average value between the driven and driving wheel speeds) on the basis of limit data stored in memory 23 and the driven wheel speed (or, the driving wheel speed when the limit data is a correlation of the upper and lower limit values of the pre-correction slip signal with the driving wheel speed; or, an average value between the speed of front wheel 4 (driven wheel speed) and the speed of rear wheel 7 (driving wheel speed) when the limit data is a correlation of the upper and lower limit values of the pre-correction slip signal with the average value between the speed of front wheel 4 (driven wheel speed) and the speed of rear wheel 7 (driving wheel speed)).

CPU 21 carries out a limit process similarly to Embodiment 2 to limit the pre-correction slip signal to be equal to or more than the lower limit value and equal to or less than the upper limit value.

CPU 21 reads in the time constant data stored in memory 23 (shown in FIGS. 16 and 17, for example). CPU 21 calculates a cutoff frequency on the basis of an average of the time constant data and the driven wheel speed (or, the driving wheel speed when the time constant data is a correlation of the time constant with the driving wheel speed; or, an average value between the speed of front wheel 4 (driven wheel speed) and the speed of rear wheel 7 (driving wheel speed) when the time constant data is a correlation of the time constant with the average value between the driven and driving wheel speeds).

For example, with reference to FIGS. 16 and 17, the time constant is judged to be 0.5 Hz when a speed of front wheel 4 (driven wheel speed) is 30 km per hour. That is, CPU 21 sets the cutoff frequency at 0.5 Hz.

CPU 21 takes out only a low frequency (lean) component (same as the low frequency component in Embodiment 1) from the pre-correction slip signal limited as described above on the basis of the cutoff frequency.

CPU 21 subtracts the low frequency component from the pre-correction slip signal to obtain the corrected slip signal. CPU 21 outputs the corrected slip signal to drive circuit 24. Drive circuit 24 outputs a control signal corresponding to the corrected slip signal to driving force adjusting means 33 and throttle drive actuator 14 (FIG. 14). Driving force control means 33 and throttle drive actuator 14 contribute to control an output of engine 10$a$.

—Operation and Effect—

As described above, a frequency of the lean component on the basis of the operation of banking motorcycle 1 by a driver is comparatively low and greatly different from a frequency of the slip component. Accordingly, it can be considered to fix the cutoff frequency as in Embodiment 1.

A speed of the operation of banking motorcycle 1 by a driver, however, is different for each speed of motorcycle 1. For example, an operation of comparatively quickly banking motorcycle 1 is possible when the speed of motorcycle 1 is comparatively slow. On the other hand, it is difficult to quickly bank motorcycle 1 when the speed of motorcycle 1 is comparatively fast, so that motorcycle 1 is banked slowly in a normal case. Accordingly, a frequency of the lean component is different for each speed of motorcycle 1.

In Embodiment 3, a cutoff frequency is calculated on the basis of the time constant data. This allows the lean component to be more accurately subtracted from the pre-correction slip signal in accordance with a speed of motorcycle 1 and achieves more preferable traction control.

In Embodiment 3, a low-pass filter process is carried out. It may be possible, however, to carry out a high-pass filter process as in Modification 1.

<<Modification 3>>

In Embodiment 3, a cutoff frequency is calculated on the basis of time constant data indicating a correlation of driven wheel speed with a time constant. A cutoff frequency, however, may be calculated on the basis of another kind of time constant data. In Modification 3, a cutoff frequency is calculated on the basis of time constant data indicating a correlation of a throttle opening with a time constant, with reference to FIGS. 18 and 19. In Modification 4, a cutoff frequency is calculated on the basis of time constant data indicating a correlation of torque of engine (driving source) 10a with a time constant, with reference to FIGS. 21 and 22.

The description of Modification 3 refers to FIGS. 1 and 2 in common with Embodiment 1 and FIG. 14 in common with Embodiment 3. Components having functions substantially the same as those in Embodiments 1-3 and Modifications 1 and 2 are described with marks in common with Embodiments 1-3 and Modifications 1 and 2 and are omitted from repeat description.

—Traction Control in Modification 3—

Figure 18:
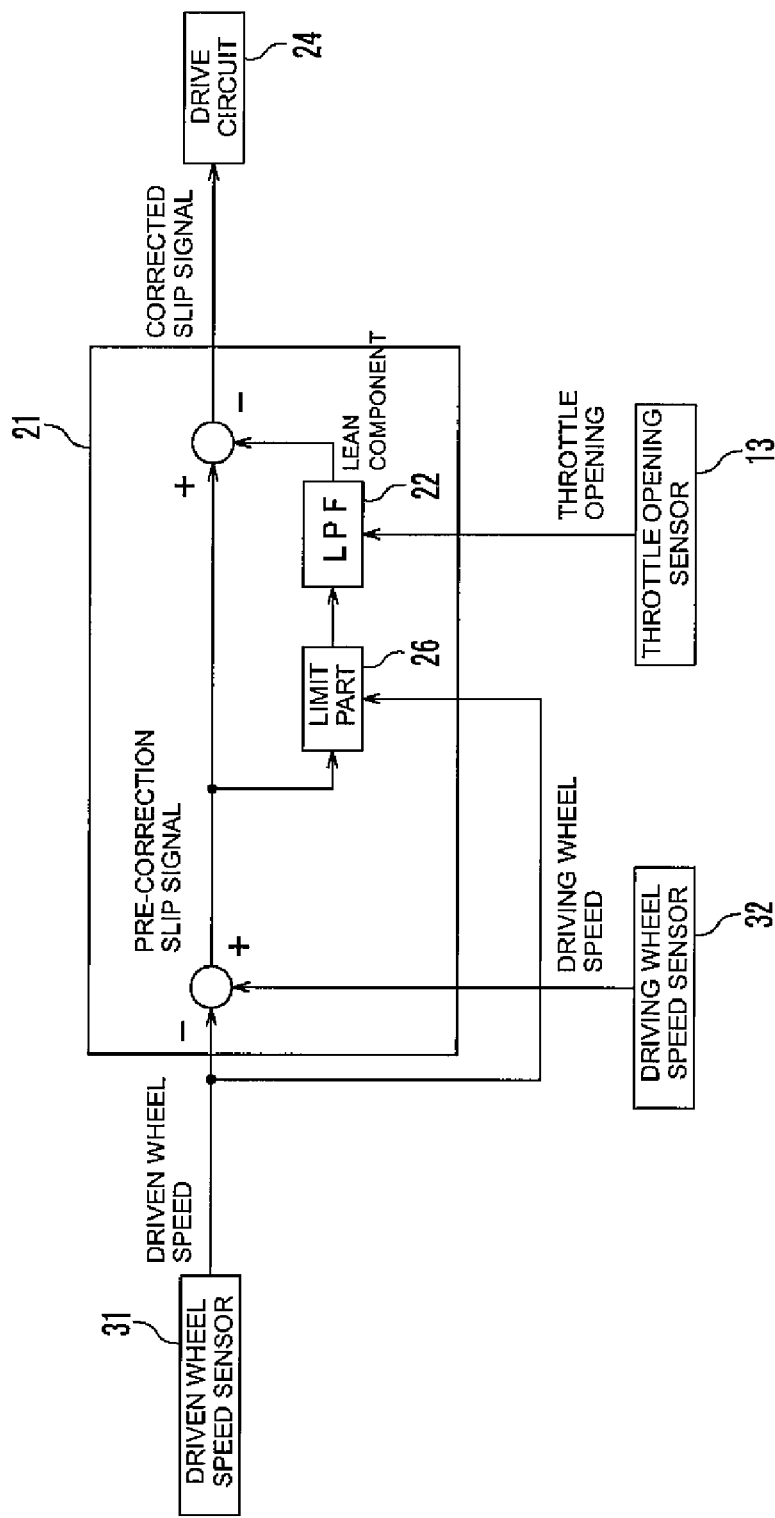
FIG. 18 is a block diagram showing traction control in a third modified embodiment (Modification 3).

As shown in FIG. 18, driven wheel speed sensor 31 outputs a speed of front wheel 4 (driven wheel speed) to CPU 21. Driving wheel speed sensor 32 outputs a speed of rear wheel 7 (driving wheel speed) to CPU 21. CPU 21 subtracts the driven wheel speed from the driving wheel speed to obtain the pre-correction slip signal.

CPU 21 obtains upper and lower limit values of the pre-correction slip signal corresponding to the driven wheel speed (or, the driving wheel speed; or, an average value between the driven and driving wheel speeds) on the basis of the limit data stored in memory 23 and the driven wheel speed (or, the driving wheel speed when the limit data is a correlation of the upper and lower limit values of the pre-correction slip signal with the driving wheel speed; or, an average value between the speed of front wheel 4 (driven wheel speed) and the speed of rear wheel 7 (driving wheel speed) when the limit data is a correlation of the upper and lower limit values of the pre-correction slip signal with the average value between the speed of front wheel 4 (driven wheel speed) and the speed of rear wheel 7 (driving wheel speed)).

Figure 20:
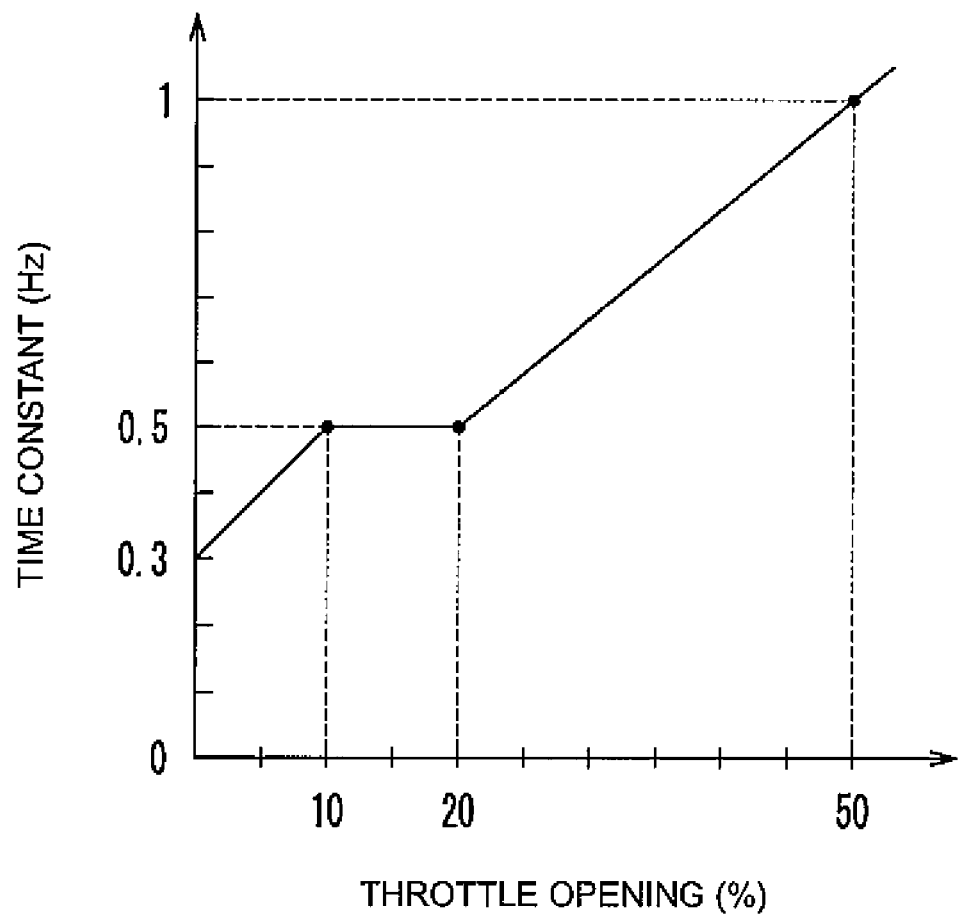
FIG. 20 is a graph correlating exemplary time constant data with a throttle opening.

CPU 21 limits the pre-correction slip signal to be equal to or more than the lower limit value and equal to or less than the upper limit value, similarly to Embodiment 2. Further, CPU 21 reads in the time constant data stored in memory 23 (the data exemplified in FIGS. 19 and 20). CPU 21 calculates a cutoff frequency on the basis of the time constant data and the throttle opening detected by throttle opening sensor 13.

CPU 21 takes out only a low frequency (lean) component (same as the low frequency component in Embodiment 1) from the pre-correction slip signal limited as described above on the basis of the calculated cutoff frequency.

CPU 21 subtracts the low frequency component from the pre-correction slip signal to obtain the corrected slip signal. CPU 21 then outputs the corrected slip signal to drive circuit 24. Drive circuit 24 outputs a control signal corresponding to the corrected slip signal to driving force adjusting means 33 and throttle drive actuator 14 (FIG. 14). Driving force control means 33 and throttle drive actuator 14 contribute to control an output of engine 10a.

<<Modification 4>>

A structure of ECU 20 and traction control in Modification 4 is now described. The description of Modification 4 refers to FIGS. 1 and 2 in common with Embodiment 1. Components having functions substantially the same as those in Embodiments 1-3 and Modifications 1 and 2 are described with marks in common with Embodiments 1-3 and Modifications 1 and 2 and are omitted from repeat description.

Figure 21:
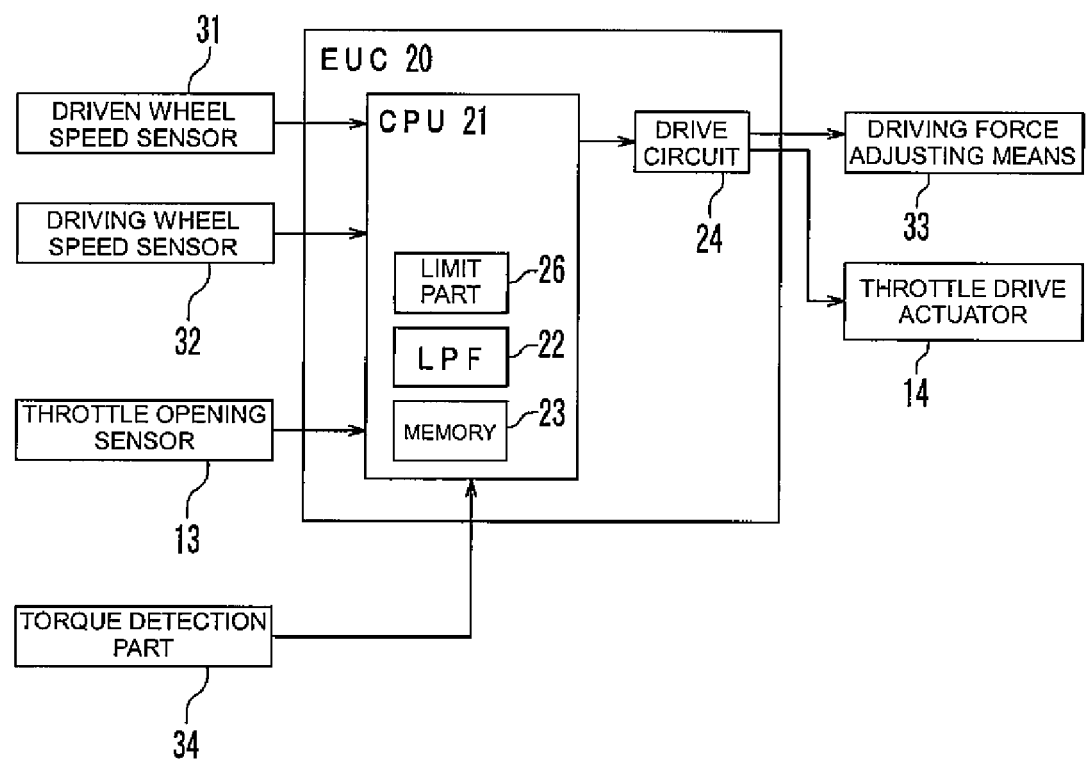
FIG. 21 is a block diagram of an ECU in accordance with a fourth modified embodiment (Modification 4).

FIG. 21 is a structural view of ECU 20 of Modification 4. ECU 20 of Modification 4 is different from ECU 20 of Embodiment 3 only in that it includes a torque detection part 34 that detects torque of engine 10a. Torque detection part 34 outputs the detected torque of engine 10a to CPU 21.

—Traction Control in Modification 4—

Figure 22:
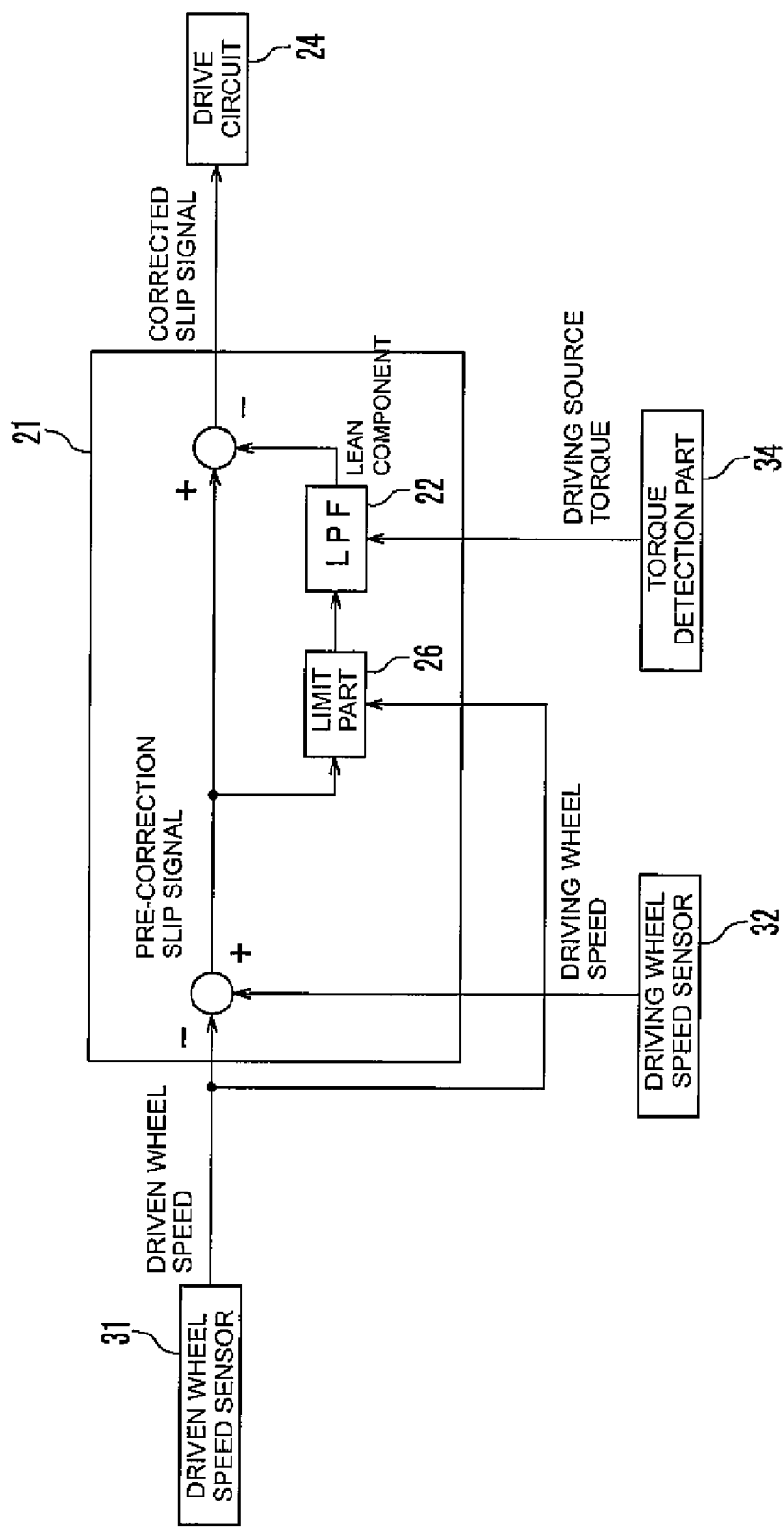
FIG. 22 is a block diagram showing traction control in Modification 4.

As shown in FIG. 22, driven wheel speed sensor 31 outputs a speed of front wheel 4 (driven wheel speed) to CPU 21. Driving wheel speed sensor 32 outputs a speed of rear wheel 7 (driving wheel speed) to CPU 21. CPU 21 subtracts the driven wheel speed from the driving wheel speed to obtain the pre-correction slip signal.

CPU 21 obtains upper and lower limit values of the pre-correction slip signal corresponding to the driven wheel speed (or, the driving wheel speed; or, an average value between the driven and driving wheel speeds) on the basis of the limit data stored in memory 23 and the driven wheel speed (or, the driving wheel speed when the limit data is a correlation of the upper and lower limit values of the pre-correction slip signal with the driving wheel speed, and an average value between the speed of front wheel 4 (driven wheel speed) and the speed of rear wheel 7 (driving wheel speed) when the limit data is a correlation of the upper and lower limit values of the pre-correction slip signal with the average value between the speed of front wheel 4 (driven wheel speed) and the speed of rear wheel 7 (driving wheel speed)).

CPU 21 limits the pre-correction slip signal to be equal to or more than the lower limit value and equal to or less than the upper limit value, similarly to Embodiment 2. Further, CPU 21 reads in the time constant data stored in memory 23. In Modification 4, the time constant data indicates a correlation of torque of engine 10a with a time constant. CPU 21 calculates a cutoff frequency on the basis of the time constant data and the driving source torque detected by torque detection part 34.

CPU 21 takes out only a low frequency (lean) component (same as the low frequency component in Embodiment 1) from the pre-correction slip signal limited as described above on the basis of the calculated cutoff frequency.

CPU 21 subtracts the low frequency component from the pre-correction slip signal to obtain the corrected slip signal. CPU 21 outputs the corrected slip signal to drive circuit 24. Drive circuit 24 outputs a control signal corresponding to the corrected slip signal to driving force adjusting means 33 and throttle drive actuator 14. Driving force control means 33 and throttle drive actuator 14 contribute to control an output of engine 10a.

Embodiments of the invention have been described. The pre-correction slip signal, however, is not limited to one obtained by subtracting the driven wheel speed from the driving wheel speed, and may be any signal correlated with a slip calculated on the basis of the driving and driven wheel speeds. For example, the pre-correction slip signal may be obtained by dividing the driving wheel speed by the driven wheel speed.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
   a driving source;
   a driving wheel driven by the driving source;
   a driven wheel;
   a control part;
   a driving wheel speed sensor for detecting a speed of the driving wheel; and
   a driven wheel speed sensor for detecting a speed of the driven wheel, wherein the control part controls the driving source based on a corrected slip signal obtained by subtracting a low frequency component of a pre-correction slip signal from the pre-correction slip signal calculated based on a speed of the driving wheel detected by the driving wheel speed sensor, and a speed of the driven wheel detected by the driven wheel speed sensor.

2. The motorcycle according to claim 1, wherein the pre-correction slip signal is obtained by subtracting a speed of the driven wheel detected by the driven wheel speed sensor from a speed of the driving wheel detected by the driving wheel speed sensor.

3. The motorcycle according to claim 1, wherein the pre-correction slip signal is obtained by dividing a speed of the driving wheel detected by the driving wheel speed sensor by a speed of the driven wheel detected by the driven wheel speed sensor.

4. The motorcycle according to claim 1, wherein the low frequency component has a frequency equal to or less than 5 Hz.

5. The motorcycle according to claim 1, wherein the control part comprises:

a low-pass filter for taking out the low frequency component from the pre-correction slip signal;

an operation part for outputting a control signal corresponding to the corrected slip signal; and a driving force adjusting part for controlling the driving source in accordance with the control signal, wherein the operation part calculates the pre-correction slip signal, outputs the pre-correction slip signal to the low-pass filter and subtracts the low frequency component taken out through the low-pass filter from the pre-correction slip signal to obtain the corrected slip signal.

6. The motorcycle according to claim 1, wherein the control part comprises:

an operation part for outputting a control signal corresponding to the corrected slip signal; and a driving force adjusting part for controlling the driving source in accordance with the control signal, wherein the operation part calculates the pre-correction slip signal, takes out the low frequency component from the pre-correction slip signal and subtracts the low frequency component from the pre-correction slip signal to obtain the corrected slip signal.

* * * * *